United States Patent [19]

Blumensaadt

[11] 4,001,950
[45] Jan. 11, 1977

[54] RESUSCITATION TRAINING APPARATUS

[75] Inventor: Hans Christian Blumensaadt, Virum, Denmark

[73] Assignee: Testa-Laboratorium A/S, Copenhagen, Denmark

[22] Filed: Mar. 12, 1973

[21] Appl. No.: 340,383

Related U.S. Application Data

[63] Continuation-in-part of Ser. No. 178,362, Sept. 7, 1971, abandoned.

[30] Foreign Application Priority Data

Feb. 26, 1971 Sweden ........................... 12211/71
Apr. 10, 1972 Sweden ........................... 4603/72

[52] U.S. Cl. .................................................. 35/17
[51] Int. Cl.² ...................................... G09B 23/28
[58] Field of Search ............... 35/17; 46/87, 88, 90; 229/53; 273/152.1

[56] References Cited

UNITED STATES PATENTS

| | | | |
|---|---|---|---|
| 1,581,450 | 4/1926 | Kampf | 229/53 UX |
| 2,283,069 | 5/1942 | Knuetter | 229/53 |
| 3,068,590 | 12/1962 | Padellford | 35/17 |
| 3,199,225 | 8/1965 | Robertson | 35/17 |
| 3,224,574 | 12/1965 | McConnell | 229/53 UX |
| 3,244,576 | 4/1966 | Swartz | 229/53 X |
| 3,562,924 | 2/1971 | Baermann | 35/17 |

FOREIGN PATENTS OR APPLICATIONS 435,290   10/1926   Germany ..................... 273/152.1

OTHER PUBLICATIONS

"Resusci–Anne Available," Article in the American Funeral Director for Aug. 1966, p. 80.

*Primary Examiner*—Harland S. Skogquist
*Attorney, Agent, or Firm*—Dorfman, Herrell and Skillman

[57] ABSTRACT

Apparatus for demonstrating and teaching resuscitation of a person by insufflating air into the lungs of the patient is provided including a simulated head having a shell enclosing a head cavity and a bladder in the cavity which may be filled with air to a predetermined volume without offering appreciable resistance to insufflation, the bladder displacing air from the head cavity to a lung simulating structure which indicates proper insufflation.

38 Claims, 15 Drawing Figures

RESUSCITATION TRAINING APPARATUS

This application is a continuation-in-part of my application Ser. No. 178,362, filed Sept. 7, 1971 now abandoned.

The invention relates to an artificial human body form or manikin for teaching artificial breathing and training according to the mouth-to-mouth or mouth-to-nose insufflation method, said form comprising a simulated hollow human head in the cavity of which there is provided an exchangeable, preferably single-use type, inflatable bladder. The inner cavity of the head through an inlet opening is in communication with an exchangeable piece representing the mouth-nose piece of the simulated head, the cavity within said head also being in communication through a conduit with a bag representing the lungs of the artificial form. The bag representing the lungs is adapted to be inflated by air displaced from the cavity of the head due to insufflation of the bladder.

In the prior art, training manikins for practicing artificial breathing are expensive and thus should be suitable to be used for teaching large groups of trainees who, one by one, perform simulated resuscitation on the manikin. In addition to a bag representing the lungs, certain prior art models of manikins have also been provided wth a corresponding bag representing the stomach and with valve means diverting the insufflated air into the stomach, rather than into the lungs, when the air insufflation is faultily performed. In all manikins in which the insufflation of air is performed from the mouth of the trainee into lung-simulating bags, balloons or the like, forming part of the manikin, there is, of course, a grave risk of spreading infections irrespective of whether the insufflation opening is provided with an exchangeable protective cloth which is renewed for every trainee. Actually to a great extent, the risk of infection is due to contagious matter which is carried by the insufflation of air into the interior of the manikin and will remain there irrespective of whether a protective cloth, or even the entire insufflation mouth-nose piece of the manikin, is exchanged.

In order to overcome this risk of infection, it has been suggested in U.S. Pat. No. 3,199,225, of common assignee herewith, sealingly to attach to the insufflation opening, the throat portion of an elastically resilient toy-type rubber balloon with the inflatable portion of the balloon extending into the cavity of the simulated head, said cavity in turn being tightly sealed except for a communication conduit leading to a flexible, expansible-collapsible bag representing the lungs. When the balloon is inflated against the action of its inherent elasticity, it will displace air from the head cavity through the conduit into the bag representing the lungs, thereby expanding the bag. The way in which the device simulates the static or dynamic resistance of the lung and chest against insufflation is thus completely dependent on the properties of the exchangeable balloon. This means that such balloon must satisfy high qualitative requirements in order that the training manikin shall operate in a way which is both anatomically correct and reproducible for each trainee. However, the normal rubber balloon of the type commonly sold as a toy, the use of which is suggested by the patentee of U.S. Pat. NO. 3,199,225 for reasons of cheapness, does not satisfy the above-defined fundamental qualitative requirements.

It is a purpose of the present invention to provide a training and teaching manikin of the type initially defined in which the simulation of the resistance of the lung and chest against insufflation is fully independent of the properties of any exchangeable bladder in the head cavity and is provided by lung simulating structure. Accordingly, the training apparatus of the present invention is characterized in that a bladder is provided in the head cavity that may be inflated or filled, without offering any appreciable resistance, to a volume at least as large as required to cause the lung simulating structure to indicate proper insufflation, the parts representing the lung and chest, and possibly the stomach, being adapted, in a way known in the art, to tend to return with a decreasing force to the uninflated state and thus to offer a predetermined increasing resistance to inflation. The resistance of the lung simulating structure to each insufflation is made to correspond to the resistance of the human lungs and chest to such an insufflation. The bladder in the head cavity is formed with a volume at least as large as required for the lung simulating structure to a predetermined volume to indicate proper insufflation of human lungs and is kept in a normally collapsed condition.

According to preference, availability and cost, the bladder in accordance with the present invention may be made of any resilient material, such as rubber, resilient plastic or the like, or any substantially non-resilient material, such as paper, plastic or the like, inasmuch as the properties of the material in accordance with the invention are not a factor influencing the way of operation of the training apparatus, that is, the bladder is made with a predetermined volume at least as large as required to cause the lung simulating structure to be filled to indicate proper insufflation and is merely filled by insufflated air to such a volume without offering appreciable resistance. In the arrangement of the present invention, the bladder is filled to the desired volume without the necessity to overcome any intrinsic resilient or inherent resistance and is always able to be filled to such a degree that it will cause the same effect on the lung simulating structure for similar insufflations. Thus, during every correctly performed insufflation, a substantial portion of the air volume normally contained within the simulated head cavity will be displaced by the bladder into the lung simulating structure or bag.

The nature of applicant's apparatus may be more fully appreciated by the following understanding of the system. Manikins used for practicing resuscitation of the type having an inflatable member in a head cavity and a lung simulating bag have a primary air system and a secondary air system. The primary air system is the system into which the trainee blows air and is separated from the secondary system by the inflatable member in the head cavity. The secondary system includes a lung simulating bag, which is not in contact with the insufflated air that may contain contagious matter. The air insufflated into the inflatable member in the head cavity displaces air in the head cavity on the outside of the inflatable member to inflate the lung simulating bag. In contrast to the prior art, the apparatus of the present invention employs a freely moving bladder in the head cavity which does not offer any appreciable resistance to being filled, so that the only resistance to insufflation is by the lung simulating structure. Hence, the rise in air pressure in the primary system upon insufflation is transferred without loss to the secondary system. This arrangement allows the pressure and volume obtained in ventilation of the lung simulating structure to be measured accurately in the secondary system by instruments, which precisely indicate whether proper ventilation of the lung simulating structure occurred during insufflation. It may be mentioned, for example, that an air volume of about 1.5 liters will preferably have to be displaced in the head cavity in order to simulate a correctly performed insufflation on an adult. In order to simulate insufflation on patients having smaller lung volumes, correspondingly small displacement of air by less complete expansion of the bladder in the head cavity will suffice. Due to the fact that the volumetric ratio between the head cavity and the lung simulating structure, as well as other relevant properties of the lung simulating structure, are inherent design parameters of the apparatus of the present invention, there will be complete uniformity of operating conditions of the present apparatus between individual single-use bladders, irrespective of any divergencies due to manufacturing tolerances between the individual single-use bladders, since the bladders are formed with a volume at least as large as required to cause the lung simulating structure to indicate when proper insufflation has occurred and may be filled with insufflated air to that volume substantially free of resistance by the bladder, that is, without extension of the material forming the walls of the bladder.

Preferably, there will be provided within the head cavity a protruding spacer element or member, such as a profile bar, extending laterally, that is, between the left and right sides of the simulated head adjacent the entrance port of the conduit leading to the lung simulating structure. The profile bar acts, on the one hand, to prevent the entrance port from being obstructed by the expanding bladder, and, on the other hand, to provide a draining outlet to the entrance port from any air pockets which may tend to form between the inner head surface and the expanding bladder during insufflation. The latter condition of air pockets is particularly a problem if the bladder is filled to a volume which approaches the volume of the head cavity. It should be understood that the formation of lasting air pockets between the inner head surface and the expanding bladder would reduce the obtainable inflating volume within the head shell and thereby change the observable reaction of the lung simulating structure, the so-called lung-compliance. Preferably, at least one additional protective element extends in parallel to the profile bar in front, behind, or on either side thereof, in order to prevent the collapsed bladder from becoming entangled under the bar while the bladder is mounted or dismounted.

The effect obtained by the above-mentioned spacer member and protective element, that is, preventing the entrance port from being obstructed by the bladder and protecting the draining outlet of the entrance port of the conduit leading to the lung structure, can also be obtained by providing within the head cavity a gas permeable wall, such as a wire screen spaced from the throat portion of the head shell and dividing the head cavity into two chambers, one of which contains the bladder and the other contains the entrance port of the conduit leading to the lung structure. The volume of the chamber containing the entrance port is preferably small compared to the volume of the chamber containing the bladder. When using this arrangement, the bladder, and hence the chamber containing the bladder, is again made with a volume at least as large as required to cause the lung simulating structure to indicate when proper insufflation has occurred.

The above-mentioned draining and non-obstructing effect may also be obtained simply by providing grooves in the inner wall of the head shell, the grooves ending in the entrance port of the conduit leading to the lung structure. By making at least one of these grooves extend to the upper portion of the head shell anatomically speaking to the skull of the manikin, it is also possible to drain air pockets, which may have been formed in the upper portion of the head cavity. The grooves may preferably be combined with the gas permeable wall described above.

There is some risk that the bladder in its fully filled condition might come into contact with the inside of the head cavity in the corners thereof and thereby cause air pockets to be formed within the cavity preventing part of the air contained in the cavity from passing into the entrance port of the conduit to the lung structure. As an additional safeguard against this risk, the inner surface of the throat portion of the cavity-enclosing head shell, from which the conduit leading to the lung structure extends, is preferably shaped so that the angle between the portion containing the conduit to the lung structure and most of the adjacent inner surface portions is greater than 120°.

In order to hold the exchangeable bladder in the simulated head structure, the bladder may be suitably provided with a tubular nipple at the bladder wall portions enclosing the bladder opening. The nipple of the bladder may be sealingly inserted either into an opening provided in the bottom of a hollow mouth-nose mask, which covers the mouth-nose portion of the head shell, to communicate with the mouth and nose openings in the mouth-nose mask, or directly into an inlet opening of the head shell in its mouth-nose region. In the former case, the nipple serves as a male part of the male-female-like connection between the mouth-nose mask and bladder, whereas in the latter case the nipple of the bladder preferably forms the female part of the connection with the mouth-nose piece or mask. Such a nipple acts to reduce, during the expiration phase, the flow velocity of the air discharged from the bladder and thereby reduces the risk of an obstruction of the outlet passage by the bladder itself due to excessive flow velocity of the discharged air. A similar favorable effect is obtained when the bladder with a neck portion is inserted over the outside of a nipple of the hollow mouth-nose mask extending into the head cavity.

It is also possible to permanently attach the exchangeable bladder to the bottom surface of the mouth-nose mask to provide an integral structure exchangeable as a unit. In this case, the attachment of the bladder opening adjacent the edge of a flange of the mouth-nose mask having a bore therethrough of given diameter provides the desirable support of the bladder wall and decreases of the outward air flow velocity during expiration of air from the bladder.

The limitation of the flow velocity of the discharged air obtained by means of the dimensioning of the inner diameter of the nipple of the bladder is preferably combined with an annular flange extending from the lower end of the nipple in a direction transverse to the longitudinal axis of the bore through the nipple. The flange, which is made stiffer than the bladder, will support the bladder wall and thereby prevent the bladder from collapsing too rapidly and blocking off the nipple opening when air is being discharged. The flange can either be made of the same material as the bladder or of another material. In the former case the flange may be formed by making the bladder with an increased thickness of material around the neck opening thereof, the thicker portion of the bladder forming the flange. If the nipple of the bladder is made with a sufficient outer diameter, the nipple itself can serve the above-mentioned purpose, no particular flange being necessary.

According to a further form of the present invention, the bladder may be formed as a bag with a reduced dimension portion providing a neck without a nipple, the bladder opening being through the neck portion. In this arrangement, the bladder preferably extends into the head cavity with the neck extending through the air opening in the head shell at its mouth-nose region. The neck portion of the bladder is held in position by the separate mouth-nose mask interfitting with the head shell at the mouth-nose region. Preferably, the mouth-nose mask has a flange portion extending into the air opening in the head shell to hold the bladder to the head shell and prevent the bladder from collapsing too rapidly and blocking the neck opening when air is being discharged.

The invention will be more closely explained by reference to the attached drawings showing some preferred embodiments of the overall device and some portions thereof, in which.

Figures 1, 2, 2A:
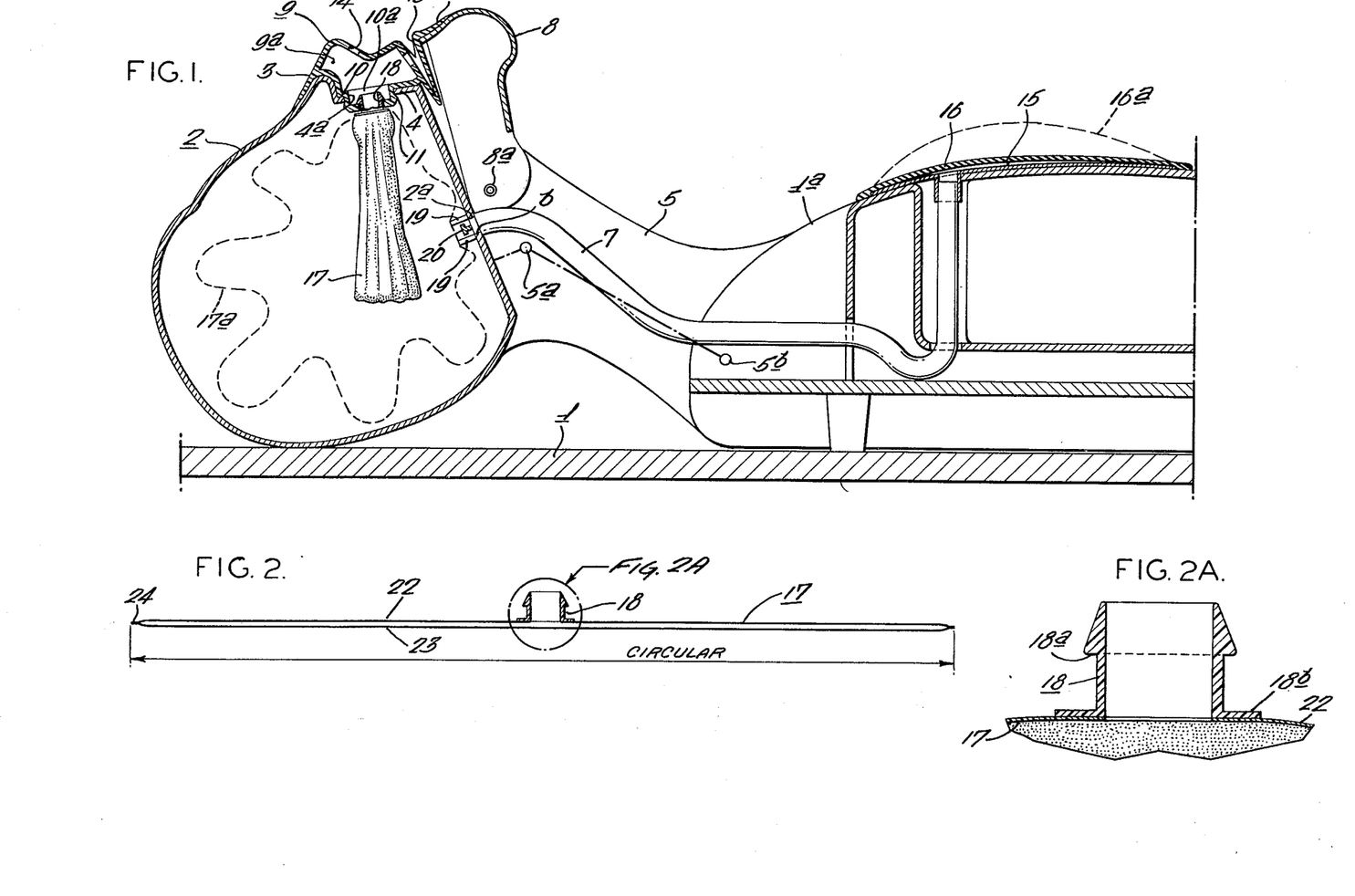
FIG. 1 is a schematic sectional view of a resuscitation training apparatus embodying the invention and showing the bladder in different positions.
FIG. 2 is a schematic side elevational view of the bladder of FIG. 1 showing the flat pieces of material from which the bladder is made and showing the nipple in section at the bladder opening.
FIG. 2A is an enlarged fragmentary section of the area encircled in FIG. 2 but showing the bladder in a filled condition.

Referring to FIG. 1, a bottom plate or base 1, which may or may not be a part of the apparatus, supports the rear portion of a simulated head 2, which comprises a one-piece shell with anatomic details including, in particular, a nose root portion 3. Anatomically speaking below the nose root portion 3, the head shell 2 is provided with a depression 4 having an air aperture or opening 4a therein, which anatomically corresponds to the common connection of the nose and the mouth to the wind-pipe.

A simulated throat or neck portion 5 extends from throat portion 2a of the head shell 2 to a chest-simulating portion 1a supported by said bottom plate 1. On the side facing the simulated neck portion 5, the head shell 2 at the throat portion 2a is provided with a throat aperture or outlet opening 6. Apart from apertures 4a and 6, the head shell 2 is impervious or completely air tight. A hose or the like 7, simulating the wind-pipe and extending through said neck 5, is at one end sealingly attached around said opening 6 and terminates at the opposite end in a cavity 15 representing the lungs of the apparatus, the lung simulating structure, in said chest portion 1a. According to the embodiment shown in FIG. 1, there is provided a resilient membrane 16, which is sealingly attached around the perimeter of cavity 15. Inflation of said membrane 16 to the alternative position 16a of the membrane in FIG. 1 is accomplished by means of air expelled from said head cavity under the action of an insufflation into mouth-nose piece 9 of the simulated head and bladder 17 attached thereto, and indicates correctly performed, simulated artificial breathing. It is, of course, also possible to replace the resilient membrane 16 with a gas-tight resilient bag which is sealingly attached to the hose 7. In this case, the leak-tight bag defines a cavity 15 and provides the lung simulating structure. As previously mentioned, the lung simulating structure is designed to provide a predetermined resistance to insufflation which corresponds to the resistance of the human lungs and chest to insufflation and is inflatable to at least a predetermined volume to indicate that proper insufflation has occurred.

A part 8 representing the lower jaw of the apparatus is movably journalled at 8a to the head shell 2 facing the throat 5. The simulated head itself is pivoted at 5a on the simulated throat 5 which in turn is pivotally connected at 5b to the chest portion 1a. The mobility of the head, throat, the lower jaw, which operates manually cooperating valves for respectively opening and closing of the respiratory conduits or ducts of the apparatus, does not form an object of the present invention and is accordingly not explained in detail herein, reference being made to U.S. Pat. No. 3,049,811, for example, for such disclosure.

The interspace between the nose root portion 3 and the lower jaw 8 is bridged by the mouth-nose piece or mask 9 consisting of resilient material and adapted sealingly to adjust itself to the simulated head over and adjacent to the nose root portion 3 and the depression 4 around wind-pipe opening 4a. The mouth-nose piece has a flange portion 10 extending inwardly toward the head shell from the mouth-nose piece 9, and extending into said wind-pipe opening 4a in sealing abutment against the wall defining said opening 4a which provides a seat, said flange portion 10 being held in position within that opening by suitable means, such as a beaded edge 11 extending around the outer periphery adjacent the end of flange portion 10.

A flap portion 12 of the mouth-nose piece 9 extends, anatomically speaking, downwardly from the mouth-nose region and covers the adjacent portion of the lower jaw 8. The mouth-nose piece 9 compliments the head shell 2 and the lower jaw portion 8 to form a life-like form of a human head and face.

The mouth-nose piece or mask 9 is hollow and is provided in an anatomically correct way with a mouth opening 13 and nostrils 14 leading into an inner cavity or duct 9a within the mouth-nose piece 9. From said inner cavity a port opening 10a extends through flange portion 10 and the beaded edge 11, whereby communication is established between the cavity 9a within the mouth-nose piece 9 and the inner cavity of bladder 17, when the bladder is disposed within the inner cavity of the simulated head 2, as shown in FIG. 1.

The part of the face of the simulated head formed by the mouth-nose piece is at least big enough, preferably exactly big enough, to ensure that the mouth of a trainee contacts only the mouth-nose piece, but not those parts of the head which are not renewed for every trainee.

In the embodiment of the invention illustrated in FIGS. 1, 2 and 2A, there is inserted into said port opening 10a within said flange portion 10 and beaded edge 11 of the mouth-nose piece 9, a neck or nipple portion 18 of the bladder 17, which is fully closed apart from its neck opening and is in communication with the cavity of the mouth-nose piece 9. The outer surface of the nipple portion 18 of bladder 17 is held in leak-tight contact with the mouth-nose piece 9, thus excluding communication between the inner cavity of the mouth-nose piece and the inner cavity of simulated head 2. The bladder is adapted, upon insufflation of air through the mouth and/or nose openings 13 and 14, respectively, of the mouth-nose piece 9, to be filled to and beyond the alternative position 17a of the bladder shown in FIG. 1, thereby expelling and displacing air enclosed within the inner cavity of simulated head 2 into the wind-pipe conduit 7 and the lung-simulating cavity 15. It is to be noted that the increase of the volume of the bladder 17 shown in FIG. 1 to and beyond the dotted line position 17a of the bladder in FIG. 1 does not involve any stretching of the material, of which the bladder is made, but the increase in volume is obtained merely by a simple unfolding of a initially collapsed bladder.

The bladder 17 illustrated in FIG. 1 is of such a volume than in a partly filled condition it will occupy a substantial part of one whole volume of the head, thus forcing a corresponding volume of air to enter into cavity 15 which causes expansion by resilient deformation of membrane 16 to the alternative position 16a in FIG. 1. As shown most clearly in FIGS. 2 and 2A, the neck or nipple portion 18 of bladder 17 is suitably beaded at the outer edge 18a, which is relatively rigid, to anchor the bladder securely in position by an overlapping or snap fit with the walls providing a seat around opening 10a of the mouth-nose piece during expansion of the bladder by insufflation of air. Bladder 17 is preferably made in a way to prevent opposed inner surface portions of the collapsed bladder from sticking together, such as by having the bladder made of a textured or three-dimensionally patterned material or by having the material otherwise treated with a non-stick film or powder. The bladder material is shown as textured in FIGS. 1, 2A and 4.

Figure 3:
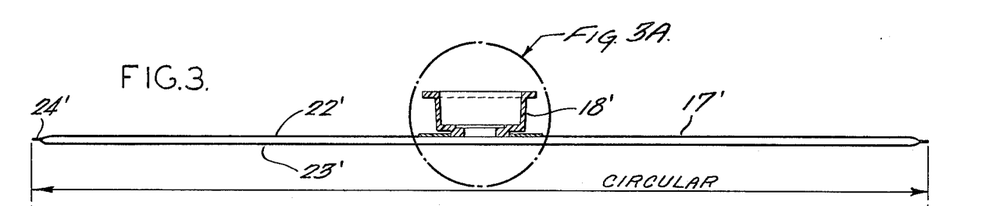
FIG. 3 is a schematic side elevational view of the bladder similar to FIG. 2, but showing an alternative form of the nipple in section at the bladder opening.
Figure 3A:
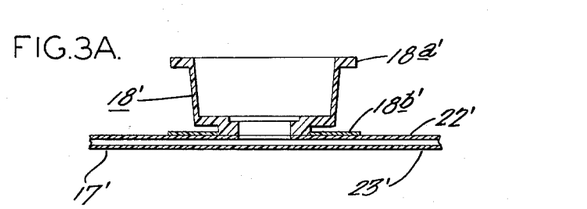
FIG. 3A is an enlarged fragmentary section of the area encircled in FIG. 3.
Figure 5:
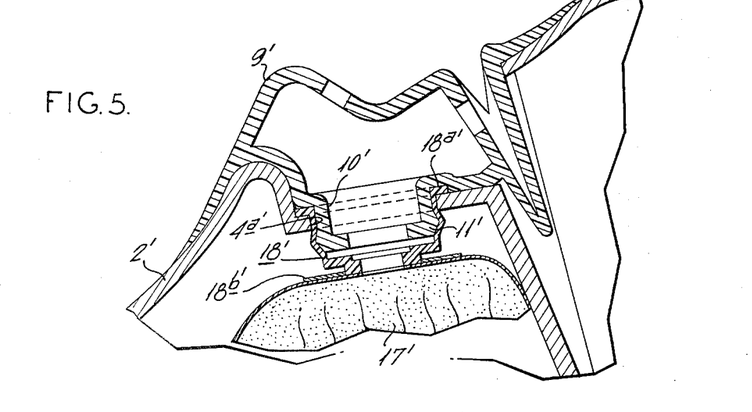
FIG. 5 is a fragmentary sectional view on an enlarged scale of a nipple and bladder of the type shown in FIG. 3 in position in the head shell with the mouth-nose piece and showing the bladder in a filled condition.

While in the embodiment shown in FIGS. 1, 2 and 2A the neck portion 18 of the bladder 17 is fitted into a surrounding annular seat in the flange portion 10 of the mouth-nose piece 9, which is in turn fitted into opening 4a of head shell 2, it is, of course, also possible to hold the bladder 17 directly to the head-simulating shell 2. This latter arrangement is preferably accomplished by inserting the nipple of the bladder in the port opening 4a of the shell 2, the outer surface of said nipple forming a leak-tight seal with the walls of the port opening 4a. Such an alternative arrangement of the nipple is illustrated in FIGS. 3, 3A and 5, wherein parts similar to those of the structure of FIGS. 1, 2 and 2A are identified by the same number designators with the addition of primes thereto. The nipple 18' of the bladder 17', shown most clearly in FIGS. 3 and 3A, is adapted to be sealingly inserted into the opening 4a' of the head shell 2' as shown in FIG. 5. The nipple 18' is in this case designed to sealingly receive the mouth-nose piece 9' to form a male-female connection, the nipple 18' serving as the female part thereof. It can be seen in FIG. 5 that the outwardly extending annular flange 18a' around the outer edge of nipple 18' rests against the wall of head shell 2' adjacent opening 4a' at the outside of the head wall. The nipple 18' receives flange portion 10' of mouth-nose piece 11' with beaded edge 11' deforming the nipple 18' on the inside of the head shell to securely hold the nipple 18' of bladder 17' fixed to the head shell.

Figure 4:
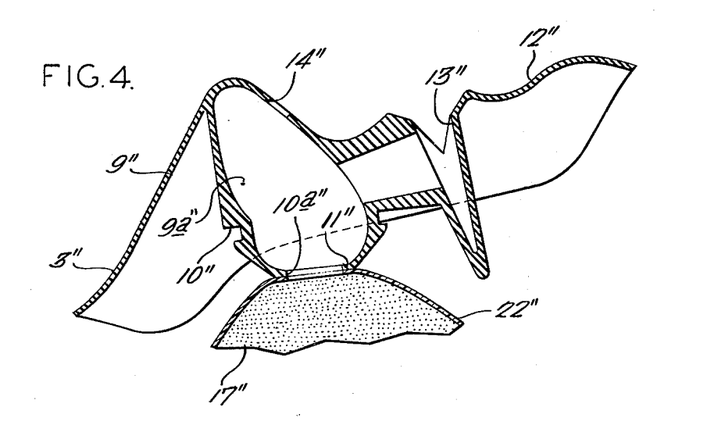
FIG. 4 is an enlarged schematic sectional view of an alternative form of the mouth-nose piece and bladder providing an integral structure exchangeable as a unit.

In FIG. 4 there is shown an alternative embodiment of the mouth-nose piece, and bladder, which are made as an integral unit, the bladder being made without a nipple. In the embodiment shown in FIG. 4, parts corresponding to those in the structure of FIG. 1 are designated by similar number designators with the addition of double primes thereto. The bladder 17'' in FIG. 4 is permanently attached directly to the outer end of the beaded edge 11'' to enable the bladder and mouth-nose piece 9'' to be integral and interchangeable as one unit. The shape of the mouth-nose piece 9'' in FIG. 4 is slightly different from the shape of the mouth-nose piece in FIG. 1, the difference being that the mouth-nose piece in FIG. 4 was formed by injection molding rather than by vacuum molding as in FIG. 1. The mouth-nose piece of FIG. 4 is held in position with the head shell by flange portion 10'' extending into the opening in the mouth-nose region of the head shell of FIG. 1 with beaded edge 11'' on the inside of the head shell in overlapping relation to the wall defining the opening in the head shell.

Irrespective of whether the nipple of the bladder is adapted to be attached or held to simulated head structure directly by use of a bladder as shown in FIGS. 3, 3A and 5 or via the mouth-nose piece 9, as shown in FIGS. 1, 2 and 2A, the nipple of the bladder is preferably provided with an annular flange 18b, as shown in FIGS. 1, 2 and 2A (or 18b' as shown in FIGS. 3, 3A and 5), which is stiffer than the bladder 17. The function of the flange 18b is to prevent the bladder from collapsing and blocking off the bore through the nipple 18 before the bladder 17 had been completely evacuated upon discharge of the air from the bladder. The flange 18b in FIGS. 2 and 2A is preferably made of a deformable material, thereby making it possible to introduce the flange 18b into the head cavity even if the flange 18b is larger than the opening 4a of the head shell 2. It should be apparent, however, that the flange 18b on bladder 17 in FIG. 2, or flange 18b' in FIG. 3, may be omitted, such a flange being omitted in FIG. 4, if the nipple or flange of the mouth-nose piece to which the bladder is attached has its opening sufficiently smaller than the peripheral area of attachment of the bladder. The manner of attachment of the bladder to the nipple or flange and the bladder material are also factors to consider in determining the best arrangement for supporting the bladder.

A spacer element, such as a profile bar 20 shown in FIG. 1 in transverse section extending across aperture 6, is attached to the inside of said head by suitable means not shown. The spacer element extends transversely of the head between positions to respectively the left and the right of aperture 6 and protrudes into the interior of head 2. In this position, the spacer element or profile bar 20 performs the double function, on the one hand, to prevent the wall of the bladder 17, when being filled, from contacting the edge of port opening 6 and thereby obstructing the wind-pipe 7 and, on the other hand, to permit air to be drained to said port opening 6 from air pockets tending to form between the bladder 17 and the inner shell surface. On one side or either side of bar 20, one or more protective elements 19 are fixed to the inside of the head shell and serve the purpose to prevent the collapsed bladder 17 from being entangled below bar 20 during mounting or dismounting of the bladder.

Figures 6, 7:
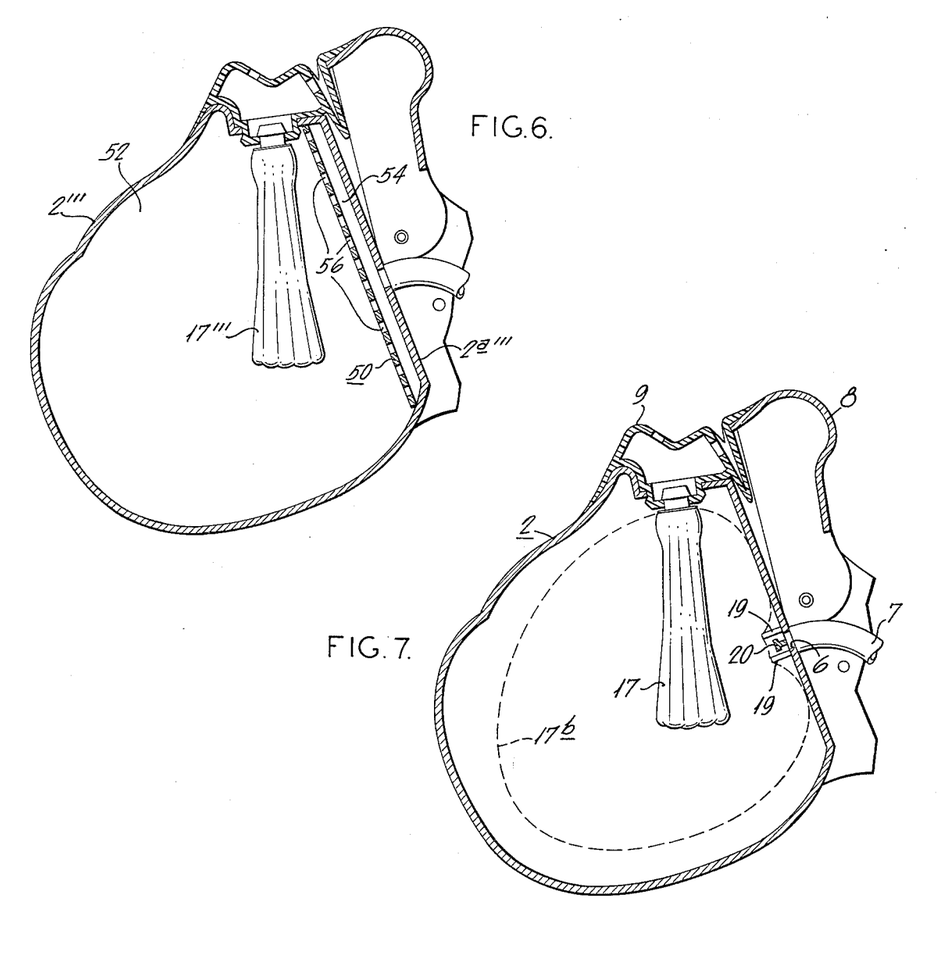
FIG. 6 is a fragmentary sectional view of the resuscitation training apparatus of FIG. 1 but showing a gas permeable wall in the head cavity dividing the head cavity into two chambers.
FIG. 7 is a fragmentary view of a portion of the resuscitation training apparatus of FIG. 1 but showing the bladder in a dotted line position as filled with a volume less than the volume of the head cavity.

The effect obtained by the spacer member and protective element can be achieved by providing a gas permeable wall in the head cavity, as previously mentioned and as shown in FIG. 6. In the modification of FIG. 6, parts similar to those in the structure of FIG. 1 are identified by the same number designators with the addition of triple primes thereto. The primary difference in the structure of FIG. 6 lies in the use of a gas permeable wall 50 in the head shell rather than a spacer element or member and protective elements. The gas permeable wall 50 extends across the head shell 2''' and is spaced a small distance from and generally parallel to the throat portion 2a'''. In this arrngement, gas permeable wall 50 divides the head cavity into a first chamber 52 containing the bladder and a second chamber 54 containing the outlet opening from the head shell leading to the lung simulating structure. The volume of first chamber 52 containing bladder 17''' is very large compared to the volume of second chamber 54. The first chamber is made sufficiently large to permit the bladder to be filled to a volume at least as large as required to allow the lung simulating structure to indicate when proper insufflation has occurred. The gas permeable wall 50 may be made of a board or plate with a plurality of apertures 56 therethrough to permit air to pass from first chamber 52 to second chamber 54 and the lung simulating structure when the bladder 17''' is filled. Alternatively, the gas permeable wall may be provided by a wire screen or the like and is fixed by any suitable means to the inside wall of the head shell. It should be apparent that the gas permeable wall does not have to contact all adjacent inside wall surfaces of the head shell, as long as the gas permeable wall is of a sufficient size that the bladder is prevented from being entangled with the edges of the gas permeable wall.

In accordance with the present invention, means is also provided for preventing the bladder, when filled, from causing air pockets with the inside shell surfaces of the head cavity. Such means for preventing pockets of air in the head cavity is provided by having the inner surface of throat portion 2a, from which opening 6 permits communication with conduit 7, formed with the adjacent inner surface portions of the head shell so that the angle between most of the portions is greater than 120°.

In operation, after use by one trainee, the mouth-nose piece 9 and the bladder 17 which may be attached or held to the mouth-nose piece are removed and replaced by a cleaned or new mouth-nose piece 9 and cleaned or new bladder 17.

It is obvious that bladder 17 may be made so inexpensively that it may be discarded after one time's use. The construction proposed by the present invention eliminates any risk that comparatively low quality of the bladder might endanger the anatomically correct function of the training apparatus or the reproducibility of the practice with the apparatus. Specifically, since the bladder is preferably made with a volume at least as large as required to cause the lung simulating structure to indicate when proper insufflation has occurred, the bladder must only withstand being filled with air to open it from its normally collapsed condition to its partially or fully filled condition, the bladder being normally collapsed in a folded condition as shown in FIG. 1. For example, the bladder may be made of two circular, flat pieces of material 22 and 23, as shown in FIG. 2, which may be polypropylene or polyethylene, that are heat sealed together around the edges of their circumference, as at 24 in FIG. 2, and the neck or nipple portion 18 of the bladder provided near the center of one of the pieces of material. The bladder is preferably made with a predetermined volume that is larger than required to displace air to the lung simulating structure for a properly performed insufflation and is formed to be filled to the predetermined volume without offering appreciable resistance to insufflation, so that the only resistance to insufflation is offered by the lung simulating structure. Also, the bladder is preferably made with the predetermined volume at least as large as the volume of the head cavity and is filled with air to generally conform to the shape of the head cavity, as indicated by the dotted line position 17a of the bladder in FIG. 1. It should be appreciated that the predetermined volume of the bladder could be smaller than the volume of the head cavity and could correspond to the volume necessary for filling the bladder to cause the lung simulating structure to indicate that proper insufflation has occurred, as indicated by the dotted line position 17b of the bladder 17 in FIG. 7, which is a fragmentary view of a portion of FIG. 1 but showing a different dotted line position of the bladder. If the bladder is made smaller than the volume of the head cavity and the volume of the bladder corresponds to the volume necessary to have the lung simulating structure indicate proper insufflation of an adult, child or patient with constructed lungs, then the bladder when filled can provide a substantial or total resistance to further insufflation, thus indicating that further insufflation could be damaging to the lungs of a patient due to excess insufflation.

Figure 8:
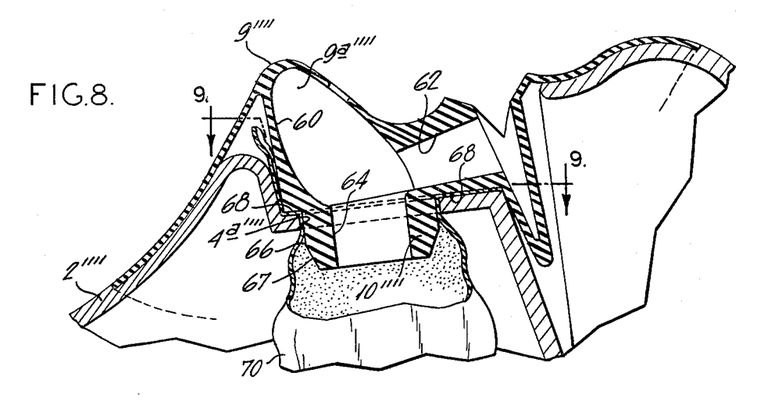
FIG. 8 is an enlarged fragmentary schematic sectional view similar to FIG. 1 but showing a modified bladder and mouth-nose mask.
Figures 9, 10:
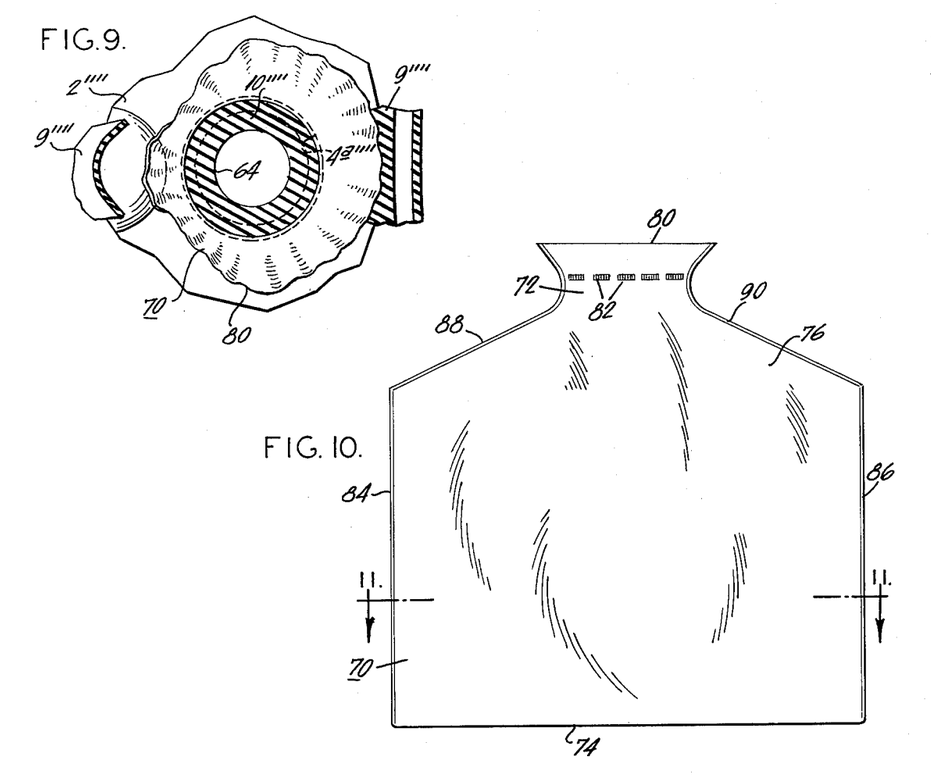
FIG. 9 is a fragmentary sectional view taken along line 9—9 of FIG. 8.
FIG. 10 is an elevational view of the bladder of FIG. 8 before use.

The use of a bladder with a nipple for attachment to the head shell or mask is not necessary. A bladder without a nipple may conveniently be used and provides a structure which is more inexpensive to manufacture. There is shown in FIGS. 8 and 9 a preferred form of the present invention that is essentially like the structure of FIGS. 1 and 2 except that the bladder is made without a nipple and the mask flange is formed without a beaded edge. As seen in FIGS. 8 and 9, parts corresponding to those in the apparatus of FIGS. 1 and 2 are identified by the same number of designators with the addition of quadruple primes thereto. The mouth-nose piece or mask 9'''' in FIG. 8 is the same as the mouth-nose piece in FIG. 1 except that the mask is made by injection molding, which has the supporting nose rib 60 and mouth opening 62 formed like the mask in FIG. 4 and, more importantly, the flange portion 10'''' is formed without a beaded edge. More specifically, the flange portion 10'''' of the mouth-nose mask 9'''' of FIG. 8 has an increased wall thickness between its inner annular surface 64 and its outer peripheral surface 66 for strengthening the flange and the flange extends a greater distance into the head cavity through air opening 4a'''' in the mouth-nose region of the head cavity. The outer peripheral surface 66 of the flange has a beveled outer end 67 for easy entrance into opening 4a'''' and is firmly or snugly received within opening 4a'''' of the head shell with annular shoulder 68 around the flange abutting at the head shell 2''''. The opening through the flange defined by inner annular surface 64 communicates with the inside of bladder 70 and cavity 9a'''' in the mouth-nose piece or mask 9'''', as shown in FIGS. 8 and 9.

Figure 11:
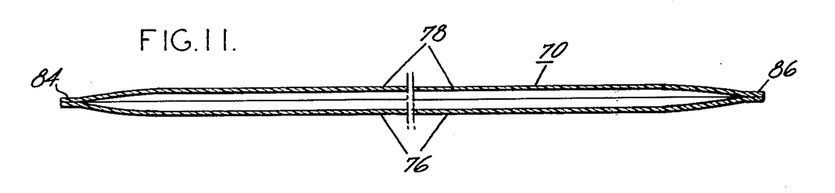
FIG. 11 is an enlarged fragmentary sectional view of the bladder taken along line 11—11 of FIG. 10.

The bladder 70 used in the apparatus of FIGS. 8 and 9 may be made in the form of a flat rectangular bag or envelope having a reduced dimension neck portion 72, as shown in FIG. 10. More particularly, the bladder 70 in FIGS. 10 and 11 is preferably made of a single piece of plastic or resinous material which is folded back on itself along bottom edge 74 to provide sides 76 and 78 of bladder or bag 70. The sides 76 and 68 are cut with the reduced dimension neck portion 72, which has an outwardly flared top portion 80. The dashed line 82 around reduced diameter neck portion 72 indicates the position of the bladder in and with respect to the opening 4a'''' in the head shell 2'''' of FIGS. 8 and 9. The sides of the bladder are heat sealed together as at along the peripheral edges, 84 and 86, and around the neck portion 72, as at 88 and 90. The bladder of FIG. 10 is inexpensive to manufacture and the material from which the bladder is made can be selected so that opposite sides of the bladder will not stick together.

Figure 12:
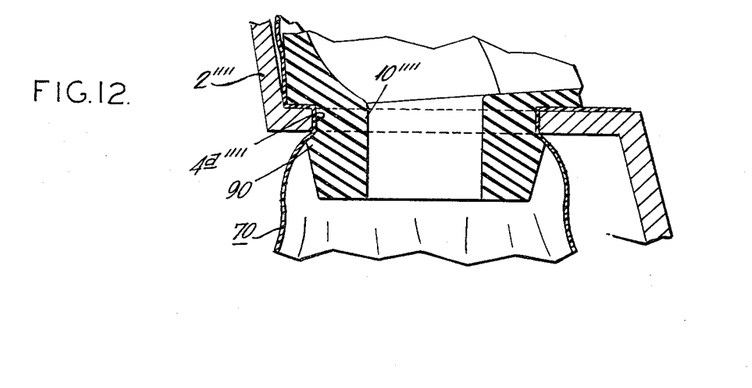
FIG. 12 is an enlarged fragmentary sectional view of the mouth-nose mask and bladder of FIG. 8 but showing the mask flange with an enlarged end portion.

In the apparatus in FIGS. 8 and 9, the bladder 70 is inserted into the head shell 2'''' through air opening 4a'''' until the neck portion at dashed line 82 is aligned with the walls of the head shell defining opening 4a''''. Then the neck portion 72 of bladder 70 is flared out around the opening 4a'''' with the flared top portion 80 of bladder 70 in overlapping relation to the outside surface of head shell 2'''' adjacent opening 4a'''', as shown in FIG. 9. The mouth-nose piece or mask 9'''' is next positioned over the mouth-nose region of the head shell with flange 10'''' of the mask press fitted into opening 4a'''' of the head shell and within flared top end 80 and neck portion 72 of bladder 70, as shown in FIGS. 8 and 9. In this arrangement, neck portion 72 of bladder 70 is held in position within the head cavity by the mask and shell, that is, the neck portion 72 is held between the interfitting surfaces of flanges 10'''' and the wall of the shell 2'''' defining opening 4a'''' and between annular surface 68 of the mask and the outer surface of shell 2'''' adjacent opening 4a'''', which capture bladder 70 therebetween to secure it firmly in position. Of course, if a tighter fit between flange portion 10'''' of the mask and the shell wall defining opening 4a'''' is desired, the flange portion may be provided with an enlarged or beaded edge portion 90 adjacent the end of its annular peripheral surface, as shown in FIG. 12, the beaded end 90 of the flange of the mask being press fitted or snap fitted within the shell inlet opening.

It is obvious that the mouth-nose piece may be of a single-use type and may be made integral with bladder as, for example, shown in FIG. 4. However, normally the mouth-nose piece will be used again after cleaning and only the bladder, as shown in FIGS. 1, 3 and 8, will be discarded after having been used once. Further, there is also the possibility of cleaning both the mouth-nose piece and the bladder for renewed use. It should also be understood that the mouth-nose piece or mask may be made without a cavity so that it would be a single thickness of material placed directly over and adjacent the air opening 4a, no depression in the mouth-nose region of the head shell being necessary. In this arrangement, the mask could be provided with nose and/or mouth openings communicating with the air opening and the mask of the bladder sealingly attached or held by the mask in or around the mask opening or the opening in the head shell, whereby when air is insufflated into the mask opening, the bladder will be filled to displace air in the head cavity and cause expansion of the lung simulating membrane or structure.

Figure 13:
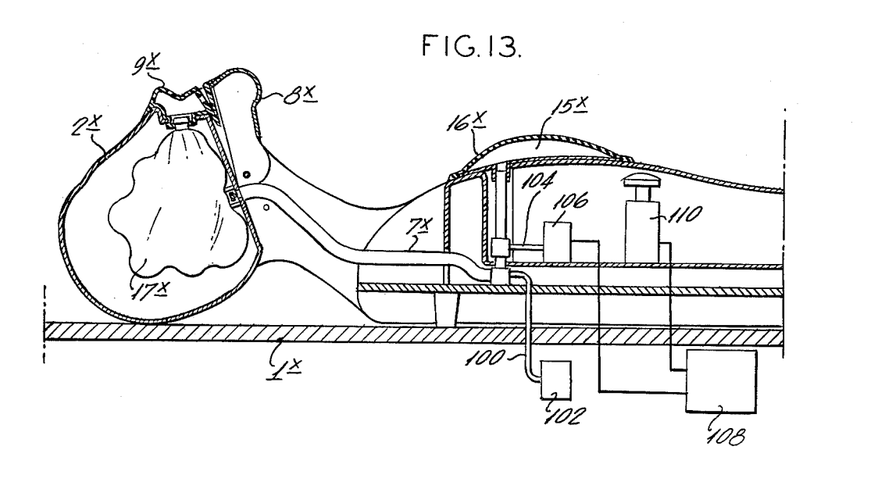
FIG. 13 is a schematic sectional view on a reduced scale of the resuscitation training apparatus of FIG. 1 with the bladder and lung simulating structure filled and showing connections for instruments in the secondary air system associated with the lung simulating structure.

In the apparatus of the present invention, the primary air system, which is the system into which the trainee blows air, is separated from the secondary air system, which includes the system outside the bladder in the head shell and the lung simulating structure, by the air-impervious bladder in the head cavity. Since the bladder of the invention may be filled with air to a volume at least as large as required to actuate the lung simulating structure to indicate proper insufflation, a rise in air pressure in the primary air system will be transferred without loss to the secondary air system. Therefore, in the overall system of the present invention, the pressure and volume obtained in ventilation of the lung simulating structure can be accurately measured in the secondary air system, where there is no contact with the insufflated air which may contain contageous matter. By way of illustration, there is shown in FIG. 13 a schematic diagram of the apparatus of FIG. 1 in use with instruments, which indicate whether proper ventilation of the lung simulating structure has occurred. In the apparatus of FIG. 13, parts similar to those in the apparatus of FIG. 1 are identified by the same number designator with the addition of the letter x thereto.

As shown in FIG. 13, a first air connection 100 is made along conduit 7x and is connected to a Ventilation Meter 102. The Ventilation Meter 102 may be provided by a conventional pressure guage, calibrated in liters, enabling the volume of air caused to be ventilated into the lung simulating structure upon insufflation to be read directly on Meter 102, thereby providing an indication of whether insufflation has been properly performed for resuscitation of a human patient. A second air connection 104 is made to a pressure switch 106, which closes an electrical circuit to generate a trigger pulse supplied to an Oxygen Saturation Meter 108, when the ventilation pressure in the lung simulating structure is sufficient upon proper insufflation. The Oxygen Saturation Meter has an associated mechanical switch 110, which is not connected in the air system but is actuated during properly performed external heart massage. The Oxygen Saturation Meter is shown and disclosed in a pending Danish patent application entitled "A Simulator", Ser. No. 4599/72, filed Sept. 21, 1972, of common assignee herewith. Hence, with the apparatus of the present invention, instruments may be used in the secondary air system, which includes the lung simulating structure, to give a precise indication of whether proper ventilation of the lung simulating structure has occurred during insufflation and whether oxygen circulation is occurring properly.

While the invention has been described with particular reference to specific embodiments thereof, it will be understood that it may be embodied in a large variety of forms different from the ones specifically shown and described without departing from the scope and spirit of the invention as defined by the appended claims.

The embodiments of the invention in which an exclusive property or privilege is claimed are defined as follows:

1. Apparatus for practicing resuscitation, comprising: a simulated head portion including a shell enclosing a cavity and having an air opening and an outlet opening, a mask detachably covering said shell adjacent said air opening and having an opening communicating with said air opening, said shell and said mask providing members of said simulated head portion, an air-impervious collapsible bladder extending into said cavity and having a portion with a bladder opening, said bladder being held by at least one of said members with the bladder opening in communication with the opening in said mask, and lung simulating means offering resistance to insufflation corresponding to the resistance of the human lungs to insufflation and responsive to air displaced from said cavity through said outlet opening by insufflation of said bladder for indicating proper insufflation, said apparatus having a primary air system including said bladder and a secondary air system including said lung simulating means responsive to air displaced from said cavity, said bladder separating the primary air system from the secondary air system and being formed to be filled with air to a volume without offering appreciable resistance at least as large as required to cause said lung simulating means to indicate proper insufflation, whereby a rise in air pressure in the primary air system is transferred without appreciable loss to said secondary air system to provide uniformity of operation for indicating proper insufflation by any user of said apparatus.

2. The apparatus of claim 1 in which said lung simulating means includes inflatable means being inflatable to at least a predetermined volume for indicating proper insufflation.

3. The apparatus of claim 1 further including instrument means responsive to air pressure in the secondary air system including the lung simulating means for indicating whether proper ventilation of the lung simulating means occurred during insufflation.

4. The apparatus of claim 1 in which said bladder is held in position within said cavity by said mask and said shell.

5. The apparatus of claim 1 in which said bladder has a portion providing a neck which is held between said mask and said shell, said bladder being made of a substantially non-resilient material.

6. The apparatus of claim 1 in which said mask has a flange portion adapted to extend into said air opening, said bladder having a reduced dimension neck portion with the bladder opening therethrough, said reduced dimension neck portion being outwardly flared at its top, said bladder extending into said cavity through said air opening and having its flared top in overlapping relation to the outside surface of said shell when the mask flange is in position extending into said air opening, whereby said bladder is held between said mask and said shell such that air insufflated into said mask opening enters said bladder without contacting said shell.

7. The apparatus of claim 1 in which said lung simulating means is provided by lung simulating structure arranged such that any appreciable resistance to insufflation is offered by said lung simulating structure.

8. The apparatus of claim 7 in which said lung simulating structure includes inflatable means for being inflated by insufflation of said bladder, said inflatable means offering a resistance to inflation corresponding to the resistance of the human lungs to insufflation.

9. The apparatus of claim 1 in which said bladder extends through air opening and into said cavity and is held in position between said mask and said shell.

10. The apparatus of claim 9 in which said bladder has a reduced dimension portion providing a neck which is held by said mask interfitting with said shell.

11. The apparatus of claim 1 in which said mask has a flange portion extending into said air opening and said opening in said mask extends through said flange portion, said bladder being held between said mask and said shell.

12. The apparatus of claim 11 in which said flange portion of said mask prevents said bladder from blocking said bladder opening when air is discharged from said bladder.

13. The apparatus of claim 1 further comprising spacer means in said cavity extending adjacent said outlet opening for preventing obstruction of said outlet opening by said bladder.

14. The apparatus of claim 13 in which said spacer means is a spacer element mounted in said shell and extending within the shell cavity adjacent said outlet opening and acting to permit air to move between said bladder and the inner shell surface and said outlet opening.

15. The apparatus of claim 14 in which said spacer element is a bar mounted in said shell in said cavity, said apparatus further comprising at least one protective element mounted in said shell and adapted to prevent said bladder from being entangled with said bar.

16. An apparatus for practicing resuscitation, comprising: a simulated head portion including a shell enclosing a cavity and having an air opening in a mouth-nose region and an outlet opening, a mask detachably covering said shell adjacent said air opening, said mask having an opening communicating with said air opening of said shell, said shell and said mask providing members of a simulated human head, an air-impervious collapsible bladder having a neck portion with an opening held by one of said members with said bladder opening in communication with said opening in said mask, and means responsive to air displaced from said cavity through said outlet opening for indicating proper insufflation, said bladder extening into said cavity and being formed to be filled with air to a volume without offering appreciable resistance at least as large as required to cause said means to indicate proper insufflation.

17. The apparatus of claim 16 in which said bladder is releasably supported by the shell adjacent said air opening such that air insufflated into the mask opening enters the bladder without contacting said shell.

18. The apparatus of claim 16 in which said bladder is releasably held by said mask with said bladder opening in communication with said mask opening.

19. The apparatus of claim 16 in which said portion of said bladder is fixed to said mask with said bladder opening in communication with said mask opening such that said bladder and said mask are connected as an integral unit.

20. The apparatus of claim 16 in which said bladder is made of a material that has means for preventing opposed inner surfaces from sticking together.

21. The apparatus of claim 16 in which said bladder is made of two non-resilient pieces of flat material which are circular in form, said pieces of material being sealed together around their circumferential edges, said neck portion of said bladder being formed on one of said pieces of material.

22. The apparatus of claim 16 in which said neck portion of said bladder includes a nipple having an outwardly extending flange to which said bladder is attached for preventing the bladder from blocking the bladder opening when air is discharged from said bladder.

23. The apparatus of claim 16 in which spacer means is provided in said cavity adjacent said outlet opening for preventing obstruction of said outlet opening by said bladder.

24. The apparatus of claim 23 in which said spacer means comprises a gas permeable member dividing said cavity of the shell into a first cavity and a second cavity, said first cavity being larger than said second cavity and containing the opening in said mouth-nose region and said bladder, said second cavity containing said outlet opening.

25. An apparatus for practicing artificial breathing according to the mouth-to-mouth or mouth-to-nose insufflation methods comprising: a simulated human head having an impervious shell enclosing a head cavity, said head having a throat opening extending through said shell at a throat portion thereof and having a depression provided in a mouth-nose region of said shell, said shell having a port opening in said depression, a hollow mouth-nose piece detachably and sealingly inserted over said depression and having mouth and nostril simulating openings communicating with an inner cavity of the mouth-nose piece, said mouth-nose piece having a port opening in the portion adjacent said shell and aligned with said port opening in said depression of said shell, an air-impervious bladder having a neck portion sealingly attached adjacent said port opening in the mouth-nose piece, said bladder extending from the mouth-nose piece through said port opening in said shell and into said head cavity, lung simulating structure including a resiliently expansible member for indicating proper insufflation, and a windpipe simulating conduit sealingly connected at one end to said lung simulating structure and at the other end to said shell at said throat opening, said bladder being formed to be filled with air insufflated into said mouth or nostril openings to a volume without offering any appreciable resistance at least as large as required to cause expansible member to indicate proper insufflation.

26. The apparatus as claimed in claim 25 further comprising a spacer element extending within the shell cavity adjacent said throat opening and acting to prevent said opening from being obstructed by said bladder and to permit air to move between said bladder and the inner shell surface and said throat opening.

27. The apparatus as claimed in claim 26 in which said spacer element is a bar supported in said cavity, said apparatus further comprising at least one protective element adjacent said bar and adapted to prevent said bladder from being entangled with said bar.

28. The apparatus as claimed in claim 25 in which the inner surface of the throat portion of the shell in which said throat opening is provided is shaped so that the angle between said throat portion and at least a substantial part of the adjacent inner surface portions of said head shell is greater than 120° to prevent air pockets from being formed in said head cavity when said bladder is insufflated.

29. The apparatus as claimed in claim 25, in which said bladder has a relatively rigid neck portion adapted sealingly to be inserted into said port opening in said mouth-nose piece.

30. The apparatus as claimed in claim 25, in which the mouth-nose piece has an annular flange portion through which said port opening extends, said flange portion extending through said port opening in said depression and into said shell cavity, said bladder neck being sealingly and detachably attached to said annular flange portion.

31. The apparatus as claimed in claim 25, in which said bladder is permanently attached to said mouth-nose piece at said port opening so that the inner bladder chamber is in communication with the cavity within said mouth-nose piece.

32. The apparatus as claimed in claim 25, in which said bladder is made of a material preventing opposed inner surface portions from sticking together.

33. The apparatus as claimed in claim 25, in which said bladder is three-dimensionally patterned in a way preventing opposed inner surface portions of the bladder from sticking together.

34. The apparatus as claimed in claim 25, in which wall portions of said shell defining said port opening in said depression provide a seat, said mouth-nose piece having a protruding portion sealingly fitting with said seat and extending through said port opening in said depression of said shell into the inner cavity of said shell, said port opening in said mouth-nose piece being provided in said protruding portion, and walls defining said port opening in the mouth-nose piece providing a seat sealingly receiving a relatively rigid part of said neck portion of said bladder.

35. The apparatus of claim 25 in which said bladder if formed to be filled with air without offering appreciable resistance to a volume substantially the size of said head cavity.

36. An apparatus for practicing mouth-to-mouth or mouth-to-nose insufflation comprising: a simulated human head having an impervious shell enclosing a head cavity and having an outlet opening in a throat portion, a lung simulating structure including a resilient expansible member for indicating proper insufflation, a wind-pipe simulating conduit sealingly connected at one end to said lung simulating structure and at its other end to said throat portion at said outlet opening, said shell having an air opening in a mouth-nose region, a mask detachably covering said shell adjacent said opening in said mouth-nose region, said mask having a simulated mouth or nose opening communicating with said air opening in said mouth-nose region of said shell, and an air-impervious collapsible bladder having a neck portion with an opening sealingly held by said mask in communication with the mask opening, said collapsible bladder being formed to be filled with air to a volume at least as large as required to cause said expansible member to indicate proper insufflation, said bladder being normally collapsed and being filled by air insufflated into said mask opening to displace air in said head cavity for expanding said expansible member.

37. The apparatus of claim 36, in which said bladder is made of a material that has means for preventing opposed inner surfaces from sticking together.

38. The apparatus of claim 36, in which said bladder is made of a substantially non-resilient material.

* * * * *